United States Patent
Kashima et al.

(10) Patent No.: US 12,465,439 B2
(45) Date of Patent: Nov. 11, 2025

(54) IMAGE PROCESSING DEVICE, IMAGE PROCESSING METHOD, AND SURGICAL MICROSCOPE SYSTEM

(71) Applicant: Sony Group Corporation, Tokyo (JP)

(72) Inventors: Koji Kashima, Tokyo (JP); Junichiro Enoki, Tokyo (JP); Tomoyuki Ootsuki, Tokyo (JP); Izumu Hosoi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 174 days.

(21) Appl. No.: 18/262,379

(22) PCT Filed: Dec. 16, 2021

(86) PCT No.: PCT/JP2021/046454
§ 371 (c)(1),
(2) Date: Jul. 21, 2023

(87) PCT Pub. No.: WO2022/163190
PCT Pub. Date: Aug. 4, 2022

(65) Prior Publication Data
US 2024/0074821 A1    Mar. 7, 2024

(30) Foreign Application Priority Data

Jan. 29, 2021 (JP) .................. 2021-013641
Sep. 22, 2021 (JP) .................. 2021-154269

(51) Int. Cl.
*A61B 34/00* (2016.01)
*A61B 3/13* (2006.01)
(Continued)

(52) U.S. Cl.
CPC .............. *A61B 34/25* (2016.02); *A61B 3/13* (2013.01); *A61B 90/20* (2016.02); *A61F 2/1662* (2013.01);
(Continued)

(58) Field of Classification Search
None
See application file for complete search history.

(56) References Cited

U.S. PATENT DOCUMENTS

| 5,963,183 A | 10/1999 | Takahashi |
| 11,389,304 B1 | 7/2022 | Nikou |

(Continued)

FOREIGN PATENT DOCUMENTS

| JP | H07-204210 A | 8/1995 |
| JP | H09-140671 A | 6/1997 |

(Continued)

OTHER PUBLICATIONS

International Search Report and Written Opinion mailed on Feb. 8, 2022, received for PCT Application PCT/JP2021/046454, filed on Dec. 16, 2021, 8 pages including English Translation.
(Continued)

*Primary Examiner* — Kyle Zhai
(74) *Attorney, Agent, or Firm* — XSENSUS LLP

(57) ABSTRACT

Provided an image processing device (13) including an image input unit (13b) that receives an operative field image; a display image generation unit (13f) that superimposes a first guide guiding a user to a motion of a surgery start instruction on the operative field image to generate a display image; and a processing start unit (13g) that starts surgery start-time processing when having detected the surgery start instruction within the first guide.

20 Claims, 9 Drawing Sheets

(51) Int. Cl.
    *A61B 90/20* (2016.01)
    *A61F 2/16* (2006.01)
    *G06T 11/00* (2006.01)
    *G06V 10/74* (2022.01)
    *G16H 20/40* (2018.01)
(52) U.S. Cl.
    CPC ............ *G06T 11/00* (2013.01); *G06V 10/761* (2022.01); *G16H 20/40* (2018.01); *A61B 2034/252* (2016.02); *A61B 2034/254* (2016.02); *G06T 2210/41* (2013.01); *G06V 2201/03* (2022.01)

(56) References Cited

U.S. PATENT DOCUMENTS

| | | |
|---|---|---|
| 2001/0027272 A1 | 10/2001 | Saito |
| 2003/0009156 A1 | 1/2003 | Levine |
| 2010/0082017 A1 | 4/2010 | Zickler |
| 2011/0230751 A1 | 9/2011 | Kersting |
| 2013/0195340 A1 | 8/2013 | Iwase |
| 2014/0223298 A1* | 8/2014 | Kim .................... G06F 3/04847 715/708 |
| 2015/0123997 A1 | 5/2015 | Hayasaka |
| 2015/0272431 A1 | 10/2015 | Fujii |
| 2016/0234488 A1 | 8/2016 | Zhao |
| 2017/0020627 A1 | 1/2017 | Tesar |
| 2017/0143442 A1 | 5/2017 | Tesar |
| 2017/0221203 A1 | 8/2017 | Iwase |
| 2017/0273558 A1 | 9/2017 | Tamura |
| 2018/0116501 A1 | 5/2018 | Akiba |
| 2018/0217429 A1 | 8/2018 | Busch |
| 2019/0015163 A1 | 1/2019 | Abhari et al. |
| 2019/0099226 A1 | 4/2019 | Hallen |
| 2019/0167474 A1 | 6/2019 | Artsyukhovich |
| 2019/0278917 A1* | 9/2019 | Chen .................. H04N 1/32144 |
| 2019/0328225 A1 | 10/2019 | Enoki |
| 2019/0328532 A1 | 10/2019 | Nakasuji |
| 2020/0029805 A1 | 1/2020 | Seesselberg |
| 2020/0229869 A1* | 7/2020 | Dorman ............. A61B 17/7076 |
| 2020/0367972 A1* | 11/2020 | Zhang .................... A61B 90/37 |
| 2021/0027485 A1* | 1/2021 | Zhang ....................... G06T 7/11 |
| 2021/0132795 A1 | 5/2021 | Kurbanova |
| 2021/0382559 A1 | 12/2021 | Segev |
| 2022/0206569 A1 | 6/2022 | Akisada |
| 2022/0370152 A1* | 11/2022 | Lavallee ............. A61B 6/4085 |
| 2023/0009290 A1 | 1/2023 | Iwasaki |
| 2023/0293239 A1 | 9/2023 | Hill |

FOREIGN PATENT DOCUMENTS

| | | |
|---|---|---|
| JP | 2002-328294 A | 11/2002 |
| JP | 2006-136714 A | 6/2006 |
| JP | 2008-022928 A | 2/2008 |
| JP | 2011-200667 A | 10/2011 |
| JP | 2012-030054 A | 2/2012 |
| JP | 2012-506272 A | 3/2012 |
| JP | 2012-152469 A | 8/2012 |
| JP | 2013-509273 A | 3/2013 |
| JP | 2015-033650 A | 2/2015 |
| JP | 2016-073409 A | 5/2016 |
| JP | 2016-112358 A | 6/2016 |
| JP | 2016-214781 A | 12/2016 |
| JP | 2018-051208 A | 4/2018 |
| JP | 2019-502415 A | 1/2019 |
| JP | 2020-506763 A | 3/2020 |
| JP | 2020-524061 A | 8/2020 |
| WO | 2016/190113 A1 | 12/2016 |

OTHER PUBLICATIONS

Miyata et al., "Color Splitting Micro-metalenses for High-sensitivity Color Image Sensors", CLEO 2021, FTu2M.5, 2021, 2 pages.

* cited by examiner

IMAGE PROCESSING DEVICE, IMAGE PROCESSING METHOD, AND SURGICAL MICROSCOPE SYSTEM

CROSS-REFERENCE TO RELATED APPLICATIONS

The present application is based on PCT filing PCT/JP2021/046454, filed Dec. 16, 2021, which claims priority to Japanese Patent Application No. 2021-013641, filed Jan. 29, 2021, and Japanese Patent Application No. 2021-154269, filed Sep. 22, 2021, the contents of each are hereby incorporated by reference.

FIELD

The present disclosure relates to an image processing device, an image processing method, and a surgical microscope system.

BACKGROUND

In recent years, refractive correction methods in ophthalmology include a widely used method of inserting an artificial lens referred to an intraocular lens (IOL) into an eye to solve refractive abnormality of a natural lens or the like and improve visual functionalities such as visual acuity. As an intraocular lens that is a substitute for the natural lens removed by a cataract surgery, an intraocular lens that can be inserted into a lens capsule is most widely used. In addition to the lens capsule insertion type, there are various intraocular lenses such as those to be fixed (indwelled) in a ciliary sulcus or the like (Phakic IOL).

For example, when performing an ophthalmic surgery such as a cataract surgery, a surgeon performs the operation with careful attention so that the incision position and the incision shape and the orientation of an implant such as an intraocular lens to be inserted with respect to the eye become appropriate in light of a preoperative plan in order to improve the visual functionalities after the operation. There is a demand to present, at the time of such a surgery, information related to an appropriate incision position, incision shape, implant orientation, and the like in a form that facilitates the operation for the surgeon. In this background, Patent Literature 1 proposes a technique of changing the position of a guide indicating a preoperative plan in accordance with the result of eyeball tracking.

CITATION LIST

Patent Literature

Patent Literature 1: JP 2011-200667 A

SUMMARY

Technical Problem

However, the known technique has a limitation in performing processing by reflecting surgeon's instructions with high accuracy and in real time, in other words, there has been a limitation in further enhancing the convenience.

In view of this, the present disclosure proposes an image processing device, an image processing method, and a surgical microscope system capable of detecting surgeon's instructions with high accuracy and in real time.

Solution to Problem

According to the present disclosure, there is provided an image processing device including: an image input unit that receives an operative field image; a display image generation unit that superimposes a first guide that guides a user to a motion of a surgery start instruction on the operative field image to generate a display image; and a processing start unit that starts surgery start-time processing when having detected the surgery start instruction within the first guide.

Furthermore, according to the present disclosure, there is provided an image processing method to be performed by an image processing device. The method includes: receiving an operative field image; superimposing a first guide that guides a user to a motion of a surgery start instruction on the operative field image to generate a display image; and starting surgery start-time processing when having detected the surgery start instruction within the first guide.

Furthermore, according to the present disclosure, there is provided a surgical microscope system including: a surgical microscope that obtains an operative field image; an image processing device that generates a display image; and a display device that displays the display image. In the surgical microscope system, the image processing device includes: an image input unit that receives the operative field image; a display image generation unit that superimposes a first guide that guides a user to a motion of a surgery start instruction on the operative field image to generate a display image; and a processing start unit that starts surgery start-time processing when having detected the surgery start instruction within the first guide.

DESCRIPTION OF EMBODIMENTS

Figure 1:
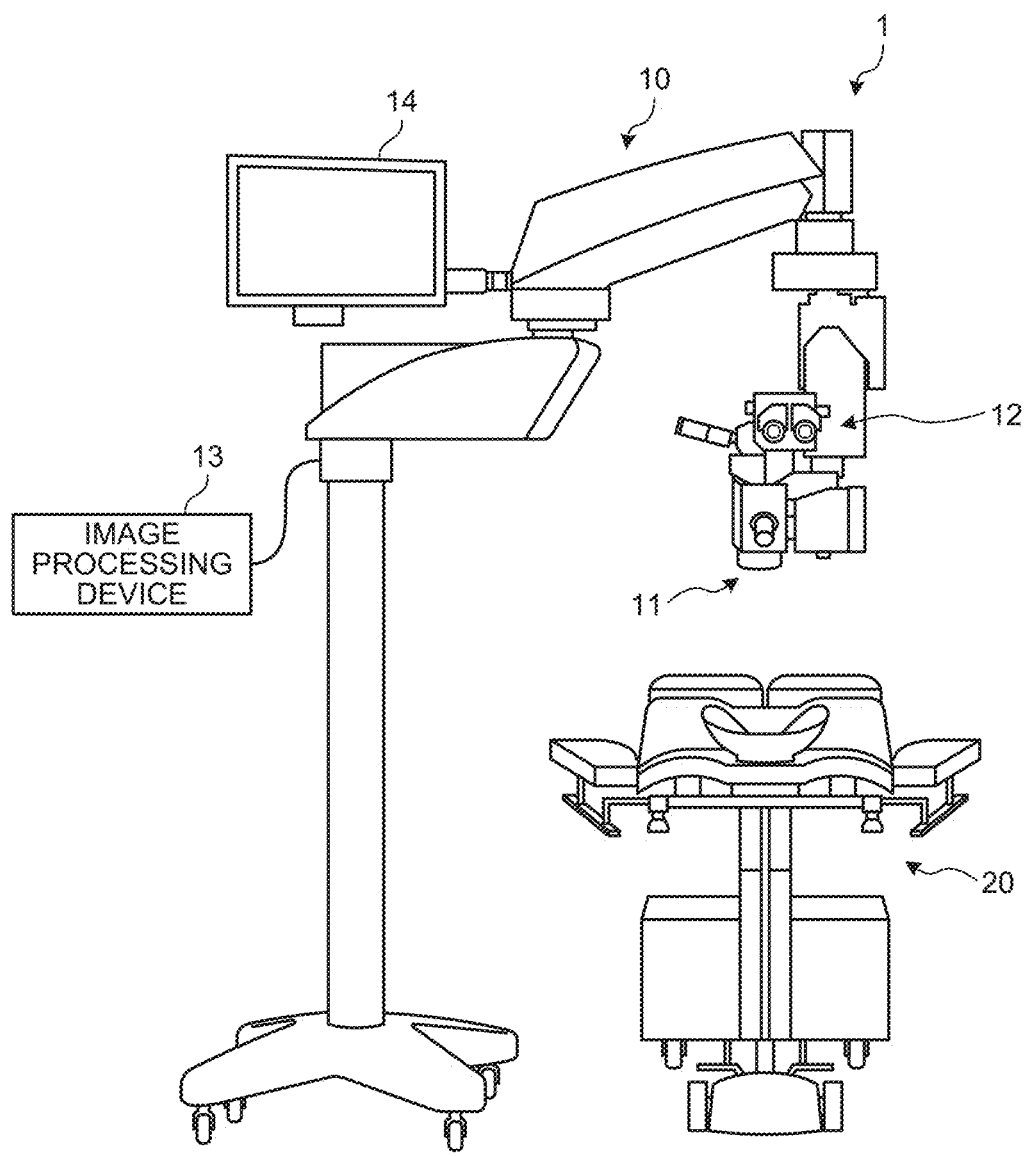
FIG. 1 is a diagram illustrating an example of a schematic configuration of a surgical microscope system 1 according to an embodiment of the present disclosure.

Preferred embodiments of the present disclosure will be described in detail hereinbelow with reference to the accompanying drawings. Note that redundant descriptions will be omitted from the present specification and the drawings by assigning the same reference signs to components having substantially the same functional configuration. Moreover, in the present specification and the drawings, a plurality of components having substantially the same or similar functional configuration will be distinguished by attaching different alphabets after the same reference numerals. However, when it is not particularly necessary to distinguish between the plurality of components having substantially the same or similar functional configuration, only the same reference numeral is given.

Note that the description will be provided in the following order.

1. Background of creation of embodiments of present disclosure
1.1 Example of schematic configuration of surgical microscope system 1
1.2 Example of schematic configuration of surgical microscope 10
1.3 Background
2. Embodiments
2.1 Schematic configuration of image processing device 13
2.2 Method of acquiring surgery start-time image
2.3 Modification of display image
3. Summary
4. Example of schematic configuration of computer
5. Supplementary notes In the following description, a preoperative image represents an image (operative field image) of the patient's eyeball used before formulating a preoperative plan. In addition, an intraoperative image represents: a pre-surgery start-time image, which is an image (operative field image) of the eyeball of the patient immediately before the start of surgery according to the determined preoperative plan; a surgery start-time image, which is an image (operative field image) of the eyeball of the patient with various image capturing conditions adjusted at the start of surgery; and an image (operative field image) of the eyeball of the patient during surgery.

1. Background of Creation of Embodiments of Present Disclosure

<1.1 Example of Schematic Configuration of Surgical Microscope System 1>

First, before describing details of an embodiment of the present disclosure, an example of a schematic configuration of a surgical microscope system 1 according to an embodiment of the present disclosure will be described with reference to FIG. 1. FIG. 1 is a diagram illustrating an example of a schematic configuration of the surgical microscope system 1 according to the embodiment of the present disclosure.

The surgical microscope system 1 according to the embodiment of the present disclosure can present, to the surgeon during surgery, instructions and a guide regarding operations such as formation of incision, anterior capsulotomy, axial alignment of an astigmatism correction intraocular lens (toric IOL), and centering of the IOL, according to a preoperative plan formulated before eyeball surgery. That is, the surgical microscope system is a system capable of performing ophthalmic surgery guidance.

Specifically, as illustrated in FIG. 1, the surgical microscope system 1 according to the embodiment of the present disclosure mainly includes a surgical microscope 10 and a patient bed 20. The patient undergoes eyeball surgery while lying on the patient bed 20. In addition, a surgeon as a doctor (also referred to as a user in this specification) performs surgery while observing an eyeball of the patient with the surgical microscope 10. Hereinafter, an outline of each component of the surgical microscope system 1 according to the embodiment of the present disclosure will be sequentially described.

(Surgical Microscope 10)

As illustrated in FIG. 1, the surgical microscope 10 mainly includes an objective lens 11, an eyepiece 12, an image processing device 13, and a monitor 14. The objective lens 11 and the eyepiece 12 are lenses for performing magnified observation of an eyeball of a patient, as a target of surgery. The image processing device 13 performs predetermined image processing on an image captured through the objective lens 11, enabling output of various images, various types of information, and the like. The monitor 14 can display an image captured through the objective lens 11, various images generated by the image processing device 13, various types of information, and the like. In the present embodiment, the monitor 14 may be provided integrally with or separately from the surgical microscope 10. Furthermore, an example of a configuration of the surgical microscope 10 will be described below.

In the surgical microscope system 1, for example, the surgeon performs surgery while looking into the eyepiece 12 and observing the eyeball of the patient through the objective lens 11. The surgeon may perform the surgery while confirming various images (such a pre-image processing image and a post-image processing image, for example), various types of information, and the like displayed on the monitor 14.

The surgical microscope system 1 according to the present embodiment is not limited to the configuration illustrated in FIG. 1, and may include other devices and the like. For example, the surgical microscope system 1 according to the present embodiment may include a robot arm (not illustrated) or the like that moves according to an operation of the surgeon at a remote location so that the surgeon at a place distant from the patient can perform remote surgery while confirming various images.

<1.2 Example of Schematic Configuration of Surgical Microscope 10>

Figure 2:
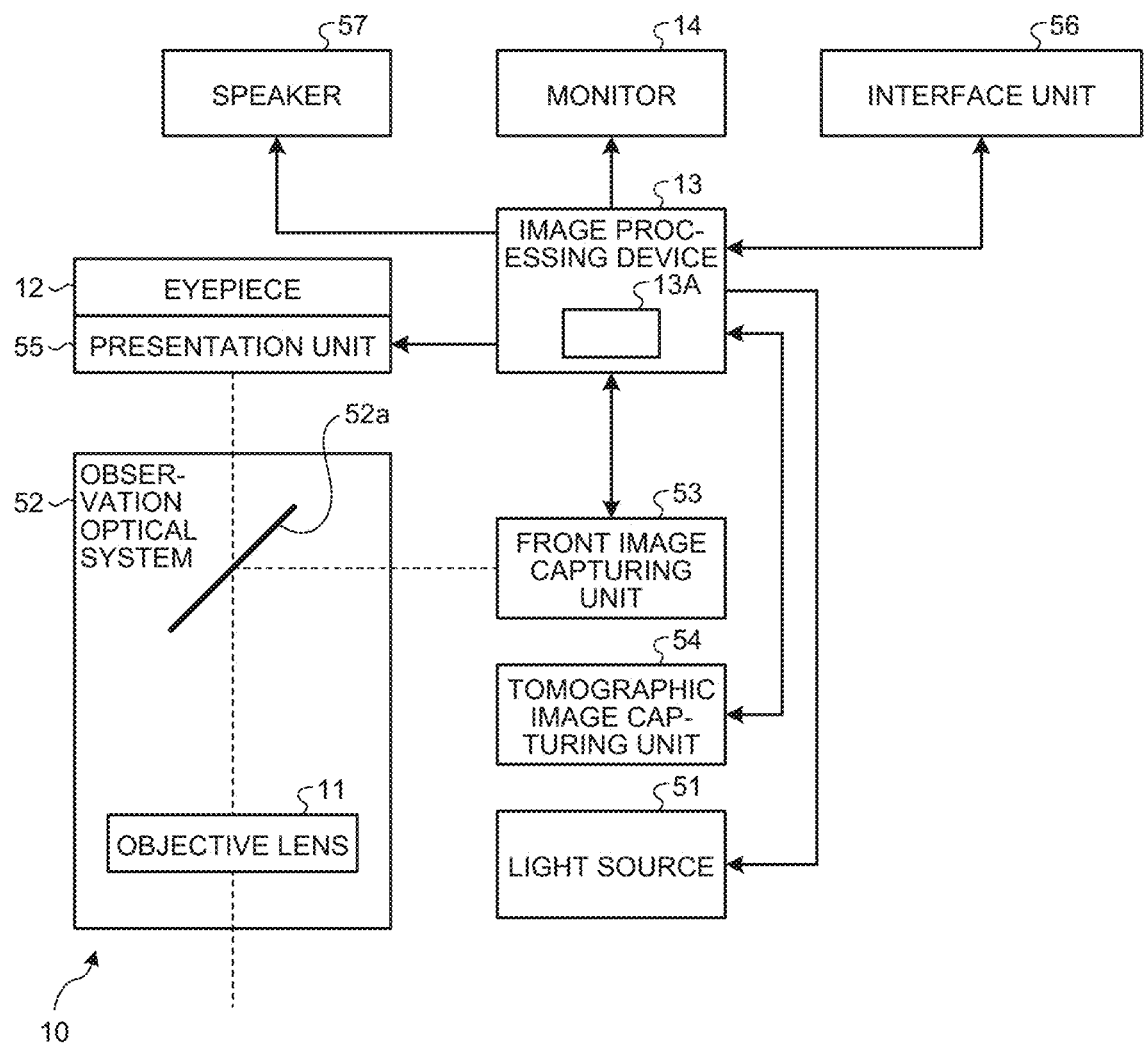
FIG. 2 is a diagram illustrating an example of a schematic configuration of a surgical microscope 10 according to the embodiment of the present disclosure.

An example of a schematic configuration of the surgical microscope 10 will be described also with reference to FIG. 2. FIG. 2 is a diagram illustrating an example of a schematic configuration of a surgical microscope 10 according to the embodiment of the present disclosure. As illustrated in FIG. 2, in addition to the components described above, namely, the objective lens 11, the eyepiece 12, the image processing device 13, and the monitor 14, the surgical microscope 10 further includes a light source 51, an observation optical system 52, a front image capturing unit 53, a tomographic image capturing unit 54, a presentation unit 55, an interface unit 56, and a speaker 57. The monitor 14 and the presentation unit 55 correspond to a display device. Hereinafter, an outline of each component of the surgical microscope 10 according to the present embodiment will be sequentially described.

(Light Source 51)

The light source 51 can emit illumination light under the control of a control unit 13A, which is included in the image processing device 13, to illuminate the eyeball of the patient.

(Observation Optical System 52)

The observation optical system 52 includes optical elements such as an objective lens 11, a half mirror 52a, and a lens (not illustrated), for example, and can guide light (observation light) reflected from the patient's eyeball to the eyepiece 12 and the front image capturing unit 53. Specifically, light reflected from the patient's eyeball enters a half mirror 52a through the objective lens 11 or the like as observation light. Substantially half of the observation light incident on the half mirror 52a passes through the half mirror 52a as it is, and is incident on the eyepiece 12 via the presentation unit 55, which is a transmissive unit. On the other hand, the remaining half of the observation light incident on the half mirror 52a is reflected by the half mirror 52a to be incident on the front image capturing unit 53.

(Front Image Capturing Unit 53)

The front image capturing unit 53 includes a device such as a video camera, for example. The front image capturing unit 53 receives and photoelectrically converts the observation light incident from the observation optical system 52, thereby capturing an image as an observed image of the patient's eyeball from the front, that is, a front image which is an image as a captured image of the patient's eyeball in substantially an eye axis direction. Specifically, the front image capturing unit 53 captures a front image (performs imaging) under the control of the image processing device 13, and supplies the front image obtained to the image processing device 13.

In the embodiment of the present disclosure, the front image capturing unit 53 is not limited to a video camera capable of acquiring a two-dimensional image, and may be a pair of video cameras capable of acquiring a three-dimensional stereo image.

(Tomographic Image Capturing Unit 54)

The tomographic image capturing unit 54 includes components such as an optical coherence tomography (OCT) and Scheimpflug camera. Under the control of the image processing device 13, the tomographic image capturing unit 54 can capture a tomographic image, being an image of a cross section of the eyeball of a patient, and supply the tomographic image obtained to the image processing device 13. Here, the tomographic image represents an image of a cross section in a direction substantially parallel to the eye axis direction in the eyeball of the patient. Incidentally, the tomographic image capturing unit 54 acquires a tomographic image by the interference principle using infrared light, and the optical path of the infrared light at that time and a part of the optical path of the observation light in the observation optical system 52 may be a common optical path.

(Eyepiece 12)

The eyepiece 12 can collect the observation light incident from the observation optical system 52 through the presentation unit 55 to form an optical image of the eyeball of the patient. Since the optical image of the patient's eyeball is formed by the eyepiece 12, the surgeon looking through the eyepiece 12 can observe the patient's eyeball.

(Presentation Unit 55)

The presentation unit 55 is formed with a device such as a transmissive display device, and is disposed between the eyepiece 12 and the observation optical system 52. The presentation unit 55 transmits the observation light incident from the observation optical system 52 to be incident on the eyepiece 12, and can also present (display) various images (such as a front image and a tomographic image, for example) and various types of information supplied from the image processing device 13 as necessary. In the present embodiment, various images, various types of information, and the like may be presented, for example, superimposed on an optical image of an eyeball of a patient, or may be presented in a peripheral portion of the optical image so as not to disturb the optical image.

(Image Processing Device 13)

The image processing device 13 includes the control unit 13A that controls the motion of the entire surgical microscope 10. For example, the control unit 13A can change illumination conditions of the light source 51 or change zoom magnification of the observation optical system 52. Furthermore, the control unit 13A can also control image acquisition of the front image capturing unit 53 and the tomographic image capturing unit 54 based on operation information or the like regarding a surgeon or the like supplied from the interface unit 56. An example of the configuration of the image processing device 13 will be described below.

(Interface Unit 56)

The interface unit 56 is formed with a unit such as a communication unit (not illustrated), for example. The communication unit can receive a command from an operation unit such as a touch panel overlaid over the monitor 14, a controller, a remote controller, an operation stick, and a foot switch (not illustrated) and can receive a command by a microphone (not illustrated) capable of receiving commands by the voice of the surgeon. The interface unit 56 may further include, for example, a camera (not illustrated) or the like that recognizes a command by the line of sight or gesture of the surgeon. For example, the surgeon can easily adjust an image or the like displayed on the monitor 14 by operating the touch panel overlaid over the monitor 14. Furthermore, the interface unit 56 can supply information or the like corresponding to the operation of the surgeon or the like to the image processing device 13. In addition, the interface unit 56 can output information such as device control information for controlling an external device and the like supplied from the image processing device 13, to the external device.

(Monitor 14)

The monitor 14 can display various images such as a front image as well as various types of information on a display screen under the control of the control unit 13A of the image processing device 13. Furthermore, in the present embodiment, as described above, a touch panel that receives the operation of the surgeon may be overlaid over the monitor 14. Furthermore, the monitor 14 may be a head mounted display (HMD) or a smart glass having a transparent display, which can be worn on the head of the surgeon.

(Speaker 57)

The speaker 57 can output a sound such as a buzzer sound or a melody sound, a message (voice), or the like in order to notify the surgeon or the like of a dangerous situation detected during surgery, under the control of the control unit 13A of the image processing device 13. In the present embodiment, the surgical microscope 10 may include a rotary lamp or an indicator light (lamp) for notifying the surgeon and the like of the dangerous situation by blinking, and a vibrator for notifying the dangerous situation by vibration.

In the surgical microscope system 1 described above, the surgeon performs detailed alignment and orientation settings of the implant such as the intraocular lens following the guide by the ophthalmic surgery guidance determined according to the preoperative plan as a reference, making it possible to implement surgery according to the preoperative plan with high accuracy.

Note that the surgical microscope 10 according to the present embodiment is not limited to the configuration illustrated in FIG. 2, and may include devices such as a plurality of monitors 14 and a plurality of speakers 57.

<1.3 Background>

Figure 3:
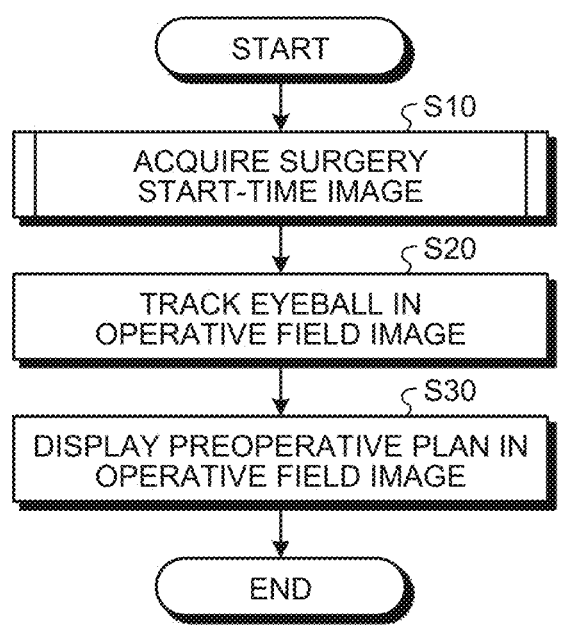
FIG. 3 is a flowchart illustrating an example of a flow of ophthalmic surgery guidance according to the embodiment of the present disclosure.
Figure 4:
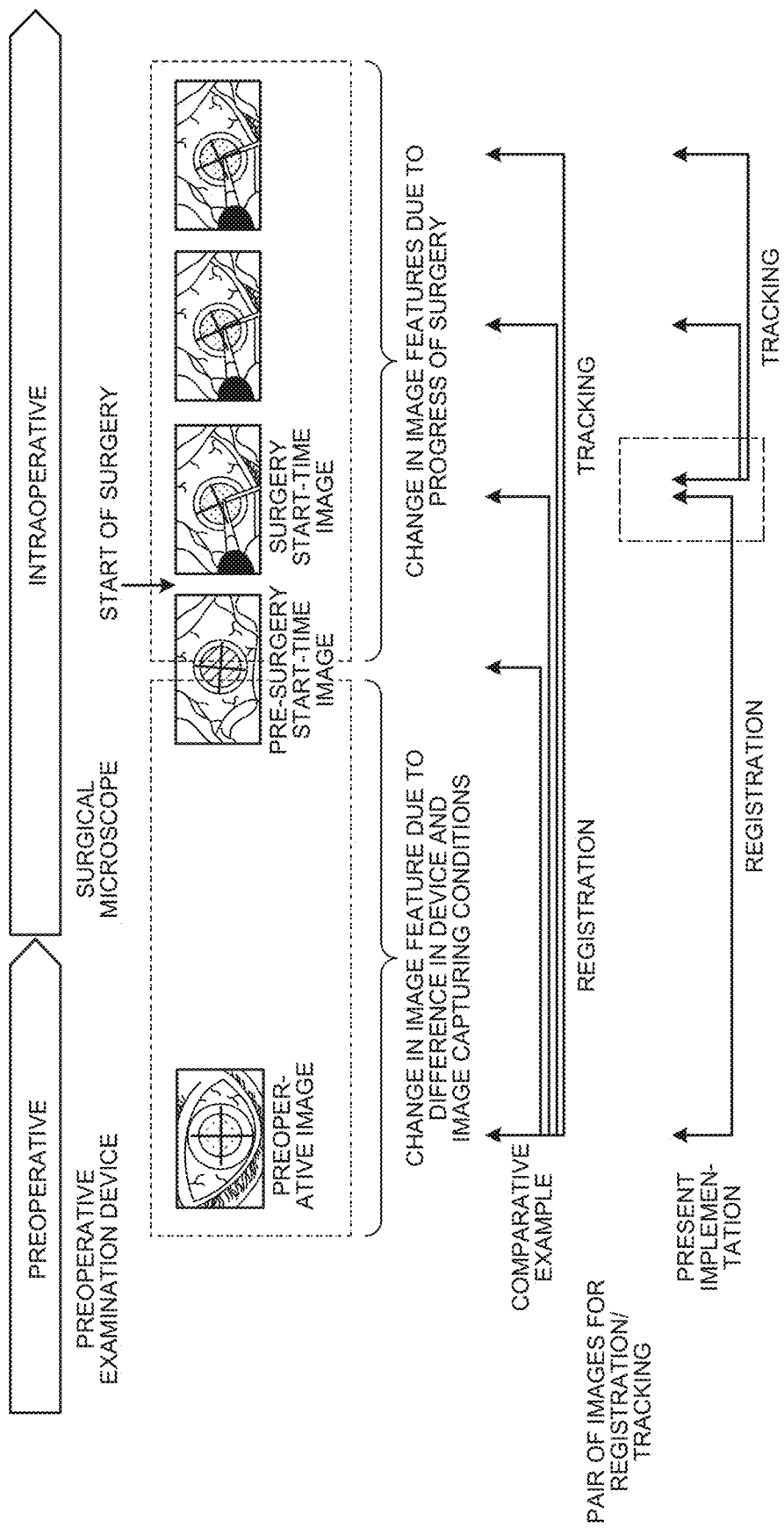
FIG. 4 is a diagram illustrating an outline of the embodiment of the present disclosure.

Next, with reference to FIGS. 3 and 4, a background leading to the creation of the embodiments of the present disclosure by the present inventors and an outline of the embodiments of the present disclosure will be described. FIG. 3 is a flowchart illustrating an example of a flow of the ophthalmic surgery guidance according to the embodiment of the present disclosure; FIG. 4 is a diagram illustrating an outline of the embodiment of the present disclosure.

First, a flow of ophthalmic surgery guidance using the surgical microscope system 1 described above will be described. Specifically, as illustrated in FIG. 3, the ophthalmic surgery guidance according to the present embodiment can mainly include a plurality of steps: step S10 to step S30. Hereinafter, an outline of each of these steps according to the present embodiment will be sequentially described.

As an initial step of the ophthalmic surgery guidance, the image processing device 13 acquires an intraoperative image, which is an operative field image of the patient's eyeball (step S10). Next, in the guidance, the image processing device 13 compares the preoperative image, which is the operative field image of the eyeball of the patient used at formation of the preoperative plan, with the intraoperative image to perform alignment (registration). Furthermore, the image processing device 13 tracks the movement of the eyeball in the intraoperative image (step S20).

During the guidance, the image processing device 13 performs superimposed display of preoperative plan information for operations such as formation of incision according to the preoperative plan, anterior capsulotomy, axial alignment of an astigmatism correction intraocular lens (toric IOL), and a guide (mark) for centering of the IOL, on an intraoperative image in accordance with the orientation of the tracked eyeball. (Step S30).

In the ophthalmic surgery guidance, the surgeon can easily perform surgery according to the preoperative plan by referring to information of the preoperative plan such as the guide. Therefore, in order to perform a surgery following the preoperative plan with high accuracy, it is important that the alignment and the tracking have been appropriately performed.

For example, as illustrated in FIG. 4, the preoperative image and the intraoperative image are acquired by different devices (a preoperative inspection device (not illustrated) and the surgical microscope 10) under different timings and different image capturing conditions, making it difficult to avoid occurrence of differences in the features (such as contrast of a contour, for example) of the images. Furthermore, in starting the surgery, the surgeon adjusts the orientation of the eyeball as the subject, the focus and zoom of the front image capturing unit 53, the brightness of the light source 51, and the like so as to obtain image capturing conditions suitable for the ophthalmic surgery. Therefore, it is inevitable that the features of the image differ between the pre-surgery start-time image before the adjustment, and the surgery start-time image on which the adjustment has been performed as well as the intraoperative image acquired thereafter.

As illustrated in FIG. 4, in a comparative example examined by the present inventors, a comparison of a pair of the preoperative image and the pre-surgery start-time image before the adjustment has been performed in the registration, while a comparison of a pair of the preoperative image and each intraoperative image has been performed in the tracking. However, since the features of the image are different in the pair of the preoperative image and each intraoperative image, there has been a limitation in performing accurate tracking.

To handle this and in order to enhance the accuracy of tracking, the present inventors have conceived the idea of performing tracking by comparing a pair of an images, namely, a surgery start-time image on which the above-described adjustment has been performed and each intraoperative image acquired thereafter, which have similar features of images. This makes it possible to use images having no difference in image features due to different devices or no difference in image features due to the timings before and after adjustment of image capturing conditions, that is, images having similar features, leading to enhanced accuracy of tracking.

In a case where tracking is performed based on the surgery start-time image, the surgery start-time image is required to be an image obtained after image capturing conditions and the like have been appropriately adjusted in order to facilitate observation of the state of an eyeball 300 during surgery. Accordingly, when acquiring a surgery start-time image, it is required that image capturing conditions and the like are appropriately adjusted, the surgeon determines whether the image is appropriate, and the image is acquired based on the determination.

Meanwhile, when acquiring an image of a scene or a person in daily life, the user performs, for example, operations including directing a digital camera to the subject while adjusting the camera, confirming the image thus obtained on the display, and further pressing a button or the like of the digital camera, enabling the data of a desired image to be saved. That is, data of an image based on a user's instruction can be obtained by pressing a button or the like.

However, in the guidance for ophthalmic surgery, the surgeon performs preparations such as wearing medical gloves and sterilizing or washing the hands for the surgery. Therefore, an operation of inputting their instructions to the system by pressing a button or the like with their hand as described above is an action to be avoided as much as possible from the viewpoint of hygiene control. Accordingly, the surgeon used to request a surgery staff member to perform input operation instead so as to achieve input of the instruction determination result of the surgeon to the system.

In view of this situation, the embodiment of the present disclosure of the present inventors eliminates the need to make such a request to the staff member and enables the surgeon to directly input an instruction to the system. Specifically, the embodiment of the present disclosure uses an image recognition technology of detecting a state in which the surgeon has inserted a surgical tool into the operative field, enabling input of the instructions of the surgeon. More specifically, the present embodiment has a configuration in which an instruction of the surgeon is input by surgeon's insertion of a surgical tool into the operative field, making it possible to input, to the system, an instruction to acquire an operative field image obtained at the detection of the insertion, as a surgery start-time image.

Furthermore, the present inventors have continued examinations on the above-described image recognition technology, and have found that it is technically difficult to perform real-time detection of insertion of various surgical tools having various shapes into substantially any position of the operative field. For example, it is assumed that an ophthalmic surgery uses various surgical tools depending on a surgical method, preference of a surgeon, or the like. However, there is a limitation in pretraining the system to learn the shapes, colors, and sizes of all surgical tools likely to be used, in order to perform image recognition. Furthermore, since the surgical tool is inserted into substantially any position in the operative field, the system would perform image recognition on the entire operative field, which inevitably increases the processing load. Consequently, in the conventional guidance of ophthalmic surgery, it is difficult to detect the insertion of the surgical tool in real time and use the detection as a trigger to acquire an operative field image at that time as the surgery start-time image. In short, the conventional guidance of ophthalmic surgery has had a limitation in performing processing by reflecting surgeon's instructions with high accuracy and in real time, in other words, there has been a limitation in further enhancing convenience.

In view of such a situation, the present inventors have created an embodiment of the present disclosure described below. In the embodiment of the present disclosure, by using a guide, being a device to guide the insertion of the surgical tool, so as to restrict an insertion position of the surgical tool as well as the shape and size of the surgical tool, it is possible to detect the insertion of the surgical tool with high accuracy and in real time. As a result, it is possible to detect the surgical tool with high accuracy and in real time with the present embodiment, enabling quickly advancing processes of acquiring an appropriate surgery start-time image according to the instruction of the surgeon, leading to enhancement of convenience.

Hereinafter, details of the embodiment of the present disclosure like this will be sequentially described.

2. Embodiment

<2.1 Schematic Configuration of Image Processing Device 13>

Figure 5:
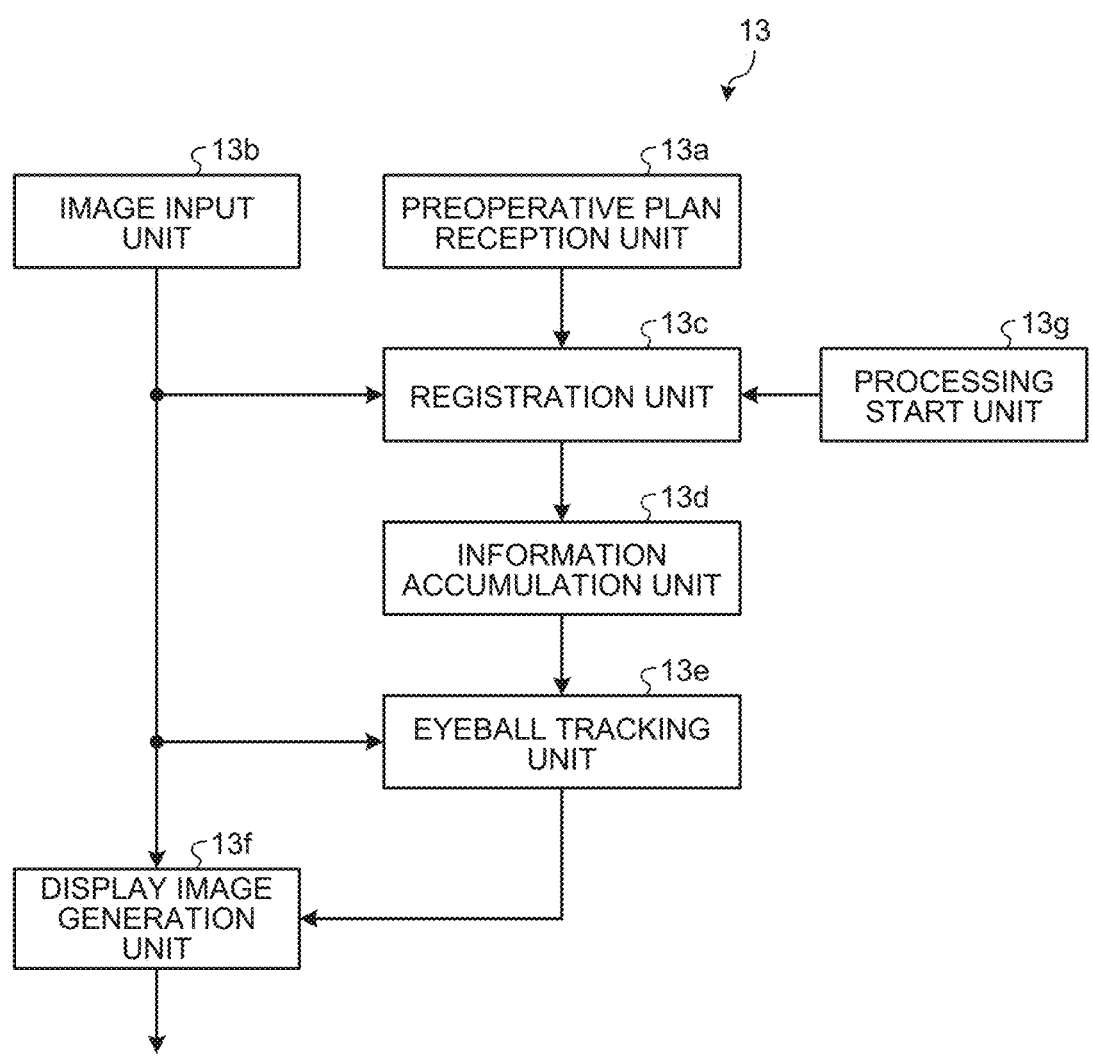
FIG. 5 is a diagram illustrating an example of a schematic configuration of an image processing device 13 according to the embodiment of the present disclosure.

Next, an example of a schematic configuration of the image processing device 13 according to the present embodiment will be described with reference to FIG. 5. FIG. 5 is a diagram illustrating an example of a schematic configuration of an image processing device 13 according to the embodiment of the present disclosure. As illustrated in FIG. 3, the image processing device 13 according to the embodiment of the present disclosure mainly includes a preoperative plan reception unit 13a, an image input unit 13b, a registration unit 13c, an information accumulation unit 13d, an eyeball tracking unit (eyeball tracker unit) 13e, a display image generation unit 13f, and a processing start unit 13g. Hereinafter, details of each component of the image processing device 13 according to the present embodiment will be sequentially described.

(Preoperative Plan Reception Unit 13a)

The preoperative plan reception unit 13a can acquire preoperative plan information (such as a preoperative image of the preoperative plan, and orientation information of the guide based on the preoperative plan, for example) regarding the eye of the patient. In the present embodiment, the orientation information of the guide includes information (such as size information, position information, and directional information) regarding a scale (size) of the guide based on the corneal limbus or the like in the preoperative image, a position of the guide, and a direction of the guide around the eye axis (a position in a rotation direction around the eye axis). For example, the direction around the eye axis is defined by an angle in a rotation direction around the eye axis with respect to a reference line orthogonal to the eye axis. However, both the position of the coordinates of the guide and the position in the rotation direction around the eye axis correspond to the position information of the guide.

(Image Input Unit 13b)

The image input unit 13b can acquire (receive) an operative field image (front image) including a preoperative image before surgery start-time, an intraoperative image during surgery, and the like from the front image capturing unit 53 (refer to FIG. 2), and can supply these operative field images to the registration unit 13c, the eyeball tracking unit 13e, the display image generation unit 13f, and the like to be described below.

(Registration Unit 13c)

By comparing the preoperative image with the intraoperative image, the registration unit 13c can obtain a correspondence relationship between the preoperative image and the intraoperative image, specifically, a difference in scale (size), a shift amount, and a shift direction. Then, the registration unit 13c can supply shift information, being information regarding a difference in scale, the shift amount and the shift direction (also referred to as registration information) to an information accumulation unit 13d and the display image generation unit 13f together with the above-described operative field image.

For example, by obtaining the correspondence relationship between the respective pixels between the preoperative image and the intraoperative image by image recognition, the registration unit 13c can obtain the registration information that is the shift information between these two operative field images. More specifically, for example, the registration unit 13c can extract a plurality of features common between the two operative field images, and obtain the shift of the entire two operative field images based on the shift of the corresponding features between the two operative field images. Although it is possible to obtain the shift of the entire two operative field images by using the correspondence relationship of all the pixels between the two operative field images, this method would increase the processing load. Therefore, by obtaining the shift using the common features, it is possible to avoid an increase in processing load.

Examples of applicable features include a pattern of a blood vessel, a scar, or the like of the eyeball, or an edge of a contour of the cornea, or the like in the patient's eyeball, and it is also allowable to preset by the surgeon which feature to use. Alternatively, in the present embodiment, the features may be automatically extracted from the operative field image by image recognition using an algorithm trained to learn images of the features by machine learning.

In the present embodiment, by using the registration information obtained by the registration unit 13c, it is possible to accurately align two different operative field images (the preoperative image and the intraoperative image) at one coordinate position. In the present embodiment, the method of acquiring the registration information is not limited to the above-described method, and various known methods can be used.

(Information Accumulation Unit 13d)

The information accumulation unit 13d can convert the orientation information of the guide in accordance with the surgery start-time image based on the registration information (shift information) and the surgery start-time image supplied from the registration unit 13c, and can accumulate the surgery start-time image as well as the orientation information of the guide converted in accordance with the surgery start-time image.

(Eyeball Tracking Unit 13e)

The eyeball tracking unit 13e can track the patient's eyeball during surgery by sequentially comparing a plurality of operative field images (intraoperative images) obtained during the operation from the surgery start-time. Furthermore, the eyeball tracking unit 13e can provide the display image generation unit 13f with displacement information indicating a difference (for example, the shift amount and the shift direction) between the orientation information of the eyeball in the intraoperative image and the orientation information of the guide (mark) accumulated by the information accumulation unit 13d. Similarly to the orientation information of the guide, the orientation information of the eyeball includes information (size information, position information, directional information, and the like) regarding the size of the eyeball, the position of the eyeball, and the direction around the eye axis (the position in the rotation direction around the eye axis) of the eyeball. Note that both the position of the coordinates of the eyeball and the position in the rotation direction around the eye axis correspond to the position information of the eyeball.

(Display Image Generation Unit 13f)

The display image generation unit 13f can generate a display image by superimposing various guides and marks on the intraoperative image based on the position information of the eyeball and the like. Specifically, the display image generation unit 13f can change the orientation (such as position and direction) of the operative field image based on the displacement information supplied from the above-described eyeball tracking unit 13e so as to cancel the positional change of the eyeball with respect to the mark of the fixed orientation (such as fixed position and fixed direction) based on the orientation information of the guide (mark), and can generate the display image by superimposing the mark of the fixed orientation on the operative field image with its orientation changed. Furthermore, the display image generation unit 13f can also adjust contrast, sharpness, saturation, lightness, and the like of an operative field image such as a preoperative image and an intraoperative image.

(Processing Start Unit 13g)

When having detected insertion of a surgical tool (motion of the surgery start instruction) on the operative field image by the image recognition, the processing start unit 13g can output an instruction to acquire and save the surgery start-time image as surgery start-time processing. Furthermore, when having detected by the image recognition that the operative field of the patient's eyeball is located in the guide displayed using superimposed display on the operative field image, the processing start unit 13g can acquire and save the operative field image at the time of detection, and output an instruction to performed superimposed display of a guide prompting insertion of the surgical tool to the display image generation unit 13f.

The embodiment below will be described assuming that the processing start unit 13g detects an instruction to acquire a surgery start-time image. However, in the present embodiment, the processing start unit 13g is not limited to the function of detecting such an instruction. For example, the processing start unit 13g may start display of information of the preoperative plan or activate various functional units as the surgery start-time processing by detecting insertion of the surgical tool. Furthermore, in the present embodiment, the motion of the surgery start instruction is not limited to the insertion of the surgical tool, and may be any motion other than insertion of the surgical tool or the like as long as the motion can be recognized by an image.

Furthermore, the image processing device 13 according to the present embodiment is not limited to the configuration illustrated in FIG. 5, and may further include another functional unit, for example.

<2.2 Method of Acquiring Surgery Start-Time Image>

Figure 6:
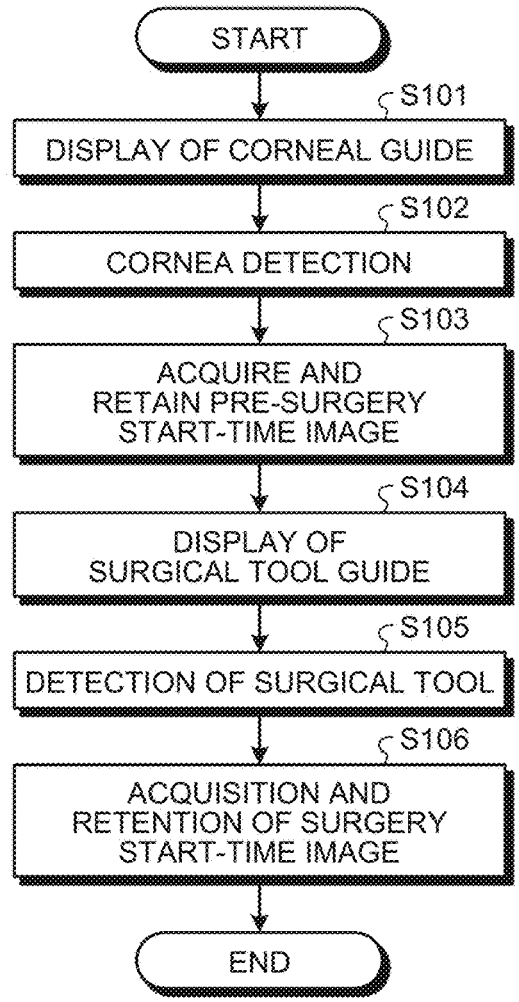
FIG. 6 is a flowchart illustrating an example of acquisition processing of a surgery start-time image according to the embodiment of the present disclosure.
Figure 7:
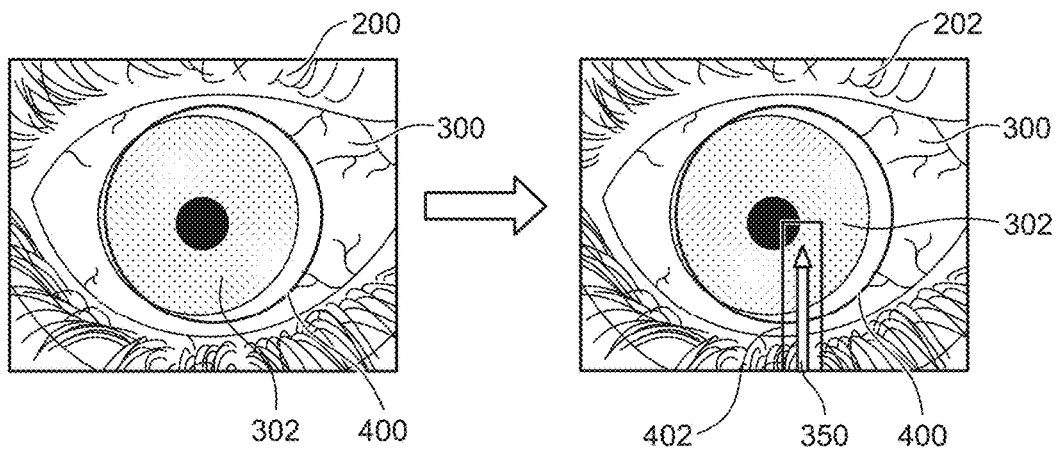
FIG. 7 is a diagram illustrating an example of a display image according to the embodiment of the present disclosure.
Figure 8:
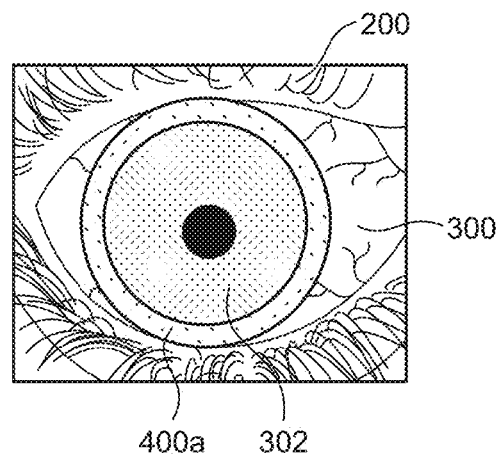
FIG. 8 is a diagram (part 1) illustrating an example of a display image according to a modification of the embodiment of the present disclosure.

Next, an example of a flow of acquiring a surgical start image according to the embodiment of the present disclosure will be described with reference to FIGS. 6 and 7. FIG. 6 is a flowchart illustrating an example of acquisition processing of a surgery start-time image according to the present embodiment, and FIG. 7 is a diagram illustrating an example of a display image according to the present embodiment. The method of acquiring a surgery start-time image according to the embodiment of the present disclosure is executed in step S10 illustrated in FIG. 3 by the image processing device 13 according to the embodiment of the present disclosure described above.

Specifically, as illustrated in FIG. 6, the acquisition of the surgery start-time image according to the present embodiment can mainly include a plurality of steps: step S101 to step S106. Hereinafter, an outline of each of these steps according to the present embodiment will be sequentially described.

First, as illustrated on the left part of FIG. 7, the image processing device 13 performs superimposed display of a corneal guide (second guide) 400 having an annular shape on an operative field image 200 of the eyeball 300 of the patient immediately before the surgery (step S101), for example. For example, the surgeon adjusts the position and orientation of the front image capturing unit 53 so that the corneal guide 400 and the contour of a cornea 302 (operative field) overlap each other or are located close to each other. Furthermore, the surgeon adjusts the focus and zoom of the front image capturing unit 53 and the brightness of the light source 51 in order to facilitate observation of the state of the eyeball 300 during the surgery. Note that, in the present embodiment, focus, zoom, and brightness adjustment may be automatically performed by the image processing device 13.

In the present embodiment, the position and scale of the cornea 302 are guided and restricted by the corneal guide 400 displayed with superimposed displayed on the operative field image 200 by the corneal guide 400. As a result, according to the present embodiment, the position and scale of the cornea 302 in surgery are guided to a predetermined state, making it possible to perform superimposed display of a guide (mark) according to the preoperative plan with high accuracy.

In the present embodiment, in a case where the front image capturing unit 53 is a camera capable of acquiring a three-dimensional stereo image, it is preferable to preliminarily select one of an L image or an R image and then perform superimposed display of the corneal guide 400 on the selected image side.

Furthermore, in the present embodiment, the form of the corneal guide 400 is not limited to the annular form as illustrated on the left side of FIG. 7, and may be an elliptical shape or a polygonal shape, with no particular limitation.

Furthermore, in the present embodiment, the corneal guide 400 is not limited to one formed with a filled annular region, and may be, for example, a thick line, a thin line, a dotted line, or a blinking line or region of a color different from the background (such as red or black, for example).

Furthermore, in the present embodiment, the scale (size) and position of the corneal guide 400 may be adjusted by the surgeon, or may be automatically adjusted according to zooming of the front image capturing unit 53 or the like. Furthermore, in the present embodiment, the number of the corneal guides 400 is not limited to one, and may be plural.

Furthermore, in the present embodiment, the position, orientation, focus, zoom, and brightness of the light source 51 of the front image capturing unit 53 may be fixed in step S101 immediately after adjustment. In the present embodiment, the surgical tool is then inserted into the operative field. At that time, in a mode (such as auto focus (AF) or auto exposure (AE)) in which the focus or the like of the front image capturing unit 53 is automatically adjusted, the focus or the like automatically would change, which might cause a change in the operative field image. In order to avoid such a change, it is preferable in the present embodiment that the position, orientation, focus, zoom, and brightness of the light source 51 of the front image capturing unit 53 be fixed after the adjustment is performed in step S101.

Next, the image processing device 13 detects, by image analysis, that the cornea 302 (operative field) is positioned in the corneal guide 400 displayed with superimposed displayed on the operative field image 200 (step S102). In the present embodiment, for example, the cornea 302 may be detected by detecting a circular or elliptical edge (predetermined shape) on the operative field image. Furthermore, in the present embodiment, it is also allowable to perform machine leaning with a large amount of images of the cornea 302 in advance, and may detect the cornea 302 by the algorithm obtained. Furthermore, in the present embodiment, when the surgeon has determined that the cornea 302 is located in the corneal guide 400, the surgeon or the like may operate a button, a switch, or a touch panel to detect that the cornea 302 is located in the corneal guide 400.

When having successfully detected, in above step S102, that the cornea 302 is located within the corneal guide 400, the image processing device 13 acquires and retains the operative field image 200 at this time as a pre-surgery start-time image (step S103). When not having successfully detected that the cornea 302 is located in the vicinity of the corneal guide 400, the image processing device 13 performs detection again when an image of the next frame is acquired. Furthermore, when not having successfully detected that the cornea 302 is located in the corneal guide 400 even when a predetermined time has elapsed since the image of the first frame is acquired, the image processing device 13 may display, on the screen, the elapsed time, the remaining time, the detection level of the cornea 302, and the like. By performing such a display, it is possible in the present embodiment to prompt the surgeon to perform adjustment again.

Next, as illustrated on the right part of FIG. 7, the image processing device 13 performs superimposed display of a surgical tool guide (first guide) 402 having a rectangular shape, for example, on an operative field image 202 of the eyeball 300 of the patient immediately before the surgery (step S104). For example, the surgeon inserts a surgical tool 350 such that the surgical tool 350 is positioned in the region of the operative field in the surgical tool guide 402, and adjusts the position and orientation of the surgical tool 350.

In the present embodiment, the type, position, orientation, and scale of the surgical tool 350 are guided and restricted by the surgical tool guide 402 displayed with superimposed display on the operative field image 202 by the surgical tool guide 402. Therefore, in the present embodiment, the position, orientation, and scale of the surgical tool 350 in surgery are guided to a predetermined state. Therefore, in the present embodiment, it is only required to perform image recognition and detection in a restricted regions of the surgical tool guide 402 or in the vicinity of the surgical tool guide 402, making it possible to suppress an increase in the processing volume for detecting the surgical tool 350. As a result, it is possible, in the present embodiment, to detect the surgical tool 350 with high accuracy and in real time. In addition, in the present embodiment, the surgical tool guide 402 can guide the insertion of the surgical tool 350 to a position not blocking the features on the image such as the texture of the eyeball 300, making it possible to perform the tracking of the eyeball and the like with high accuracy.

Note that, in the present embodiment, the form of the surgical tool guide 402 is not limited to the rectangular form as illustrated on the right part of FIG. 7, and may be a circular shape, an elliptical shape, a triangular shape, or a polygonal shape, with no particular limitation. Furthermore, in the present embodiment, the surgical tool guide 402 is not limited to the formation with a thick line, and may be formed with a filled region, for example, or may be a thick line, a thin line, a dotted line, or a blinking line or region of a color different from the background (such as red or black, for example).

Furthermore, in the present embodiment, the scale (size) and position of the surgical tool guide 402 may be adjusted by the surgeon, or may be automatically adjusted according to zooming of the front image capturing unit 53 or the like. Furthermore, in the present embodiment, the number of the surgical tool guide 402 is not limited to one, and may be plural.

Next, the image processing device 13 detects, by image analysis, that the surgical tool 350 is positioned in the surgical tool guide 402 displayed with superimposed displayed on the operative field image 202 (step S105). In the present embodiment, for example, the state of the surgical tool 350 positioned in the surgical tool guide 402 may be detected by detecting a difference (for example, a difference between the pre-surgery start-time image and the operative field image (current operative field image) acquired thereafter) in images in the surgical tool guides 402 of two frames. This makes it possible, in the present embodiment, to suppress an increase in the processing volume for detecting the surgical tool 350. Furthermore, in the present embodiment, it is preferable not only to detect the difference in the image in the surgical tool guide 402 as described above, but also to detect that there is no difference in images outside the surgical tool guide 402. In the present embodiment, by performing such detection together, it is possible to prevent erroneous detection of the surgical tool 350 not intended by the surgeon.

Specifically, as a method for detecting that the surgical tool 350 is positioned in the surgical tool guide 402 in the present embodiment, there is a method, for example, in which the image processing device 13 clips a region of interest (ROI) at an identical location and having an identical size from the pre-surgery start-time image and the operative field image (current operative field image) acquired thereafter (for example, the ROI is set in the surgical tool guide 402). The image processing device 13 then calculates a difference between pixel values in pixels at the identical position in each ROI. Next, in a case where the difference between the pixel values exceeds a predetermined threshold, the image processing device 13 recognizes that a difference occurs in the corresponding pixel. Furthermore, in a case where the total area of the pixels having a difference with respect to the entire area of the ROI is a predetermined ratio or more, the image processing device 13 detects that the surgical tool 350 has been inserted into the operative field within the surgical tool guide 402.

In the present embodiment, the size, shape, position, and the like may be the same or different between the surgical tool guide 402 and the ROI, which is a range for detecting a difference for detecting that the surgical tool 350 is positioned within the surgical tool guide 402. Incidentally, in the present embodiment, the surgical tool guide 402 is preferably displayed to be large in order to be visually recognized, and the ROI is preferably set to be smaller than that of the surgical tool guide 402.

In the present embodiment, in order to improve the robustness of difference detection, differences from operative field images of a plurality of frames acquired continuously may be detected. Furthermore, in the present embodiment, in a case where the front image capturing unit 53 is a video camera capable of acquiring a color image, a theoretical sum of differences in pixel values of three pixels of red, green, and blue may be used, or a difference in pixel value of one pixel out of the three pixels of red, green, and blue may be used. Alternatively, in the present embodiment, a difference in luminance (Y) obtained by converting pixel values of three pixels of red, green, and blue may be used, and it is preferable to perform selection according to processing capability, processing speed, and the like of the system.

Furthermore, in the present embodiment, the insertion of the surgical tool 350 into the operative field in the surgical tool guide 402 may be detected by detecting a trajectory of an object moving within the surgical tool guide 402 or in the vicinity of the surgical tool guide 402 from images of consecutive frames.

Alternatively, in the present embodiment, the following method can also be adopted as a method for detecting that the surgical tool 350 is positioned within the surgical tool guide 402. For example, based on the three-dimensional stereo image, the image processing device 13 acquires a depth map of the operative field before the surgical tool 350 is inserted. Next, the image processing device 13 performs superimposed display of the surgical tool guide 402 similarly to the above-described example, and the surgeon inserts the surgical tool 350 according to the surgical tool guide 402. Furthermore, the image processing device 13 may acquire a depth map of the operative field after the surgical tool 350 is inserted based on the three-dimensional stereo image, and may detect that the surgical tool 350 is inserted into the operative field in the surgical tool guide 402 by obtaining a difference between the acquired two depth maps.

Furthermore, in the present embodiment, it is also allowable to perform machine leaning with a large amount of images of the surgical tool 350 in advance, and may detect the surgical tool 350 by the algorithm obtained. Furthermore, in the present embodiment, when the surgeon has determined that the surgical tool 350 is located in the surgical tool guide 402, the surgeon or the like may operate a button, a switch, or a touch panel to detect that the surgical tool 350 is located in the surgical tool guide 402.

When having successfully detected, in above step S105, that the surgical tool 350 is located within the surgical tool guide 402, the image processing device 13 acquires and retains the operative field image 202 at this time as a surgery start-time image (step S106). When not having successfully detected that the surgical tool 350 is located in the vicinity of the surgical tool guide 402, the image processing device 13 performs detection again when an image of the next frame is acquired. Furthermore, when not having successfully detected that the surgical tool 350 is located in the surgical tool guide 402 even when a predetermined time has elapsed since the image of the first frame is acquired, the image processing device 13 may display, on the screen, the elapsed time, the remaining time, the detection level of the surgical tool 350, and the like. By performing such a display, it is possible in the present embodiment to prompt the surgeon to perform adjustment again.

In the present embodiment, after the surgery start-time image is acquired in this manner, registration and tracking are performed using the acquired surgery start-time image as a reference image, and a guide (mark) or the like based on the preoperative plan is displayed with superimposed display on the intraoperative image according to the result.

As described above, in the embodiment of the present disclosure, the position, shape, and size of the surgical tool 350 to be inserted are restricted by using the surgical tool guide 402 that guides the insertion of the surgical tool 350. Therefore, in the present embodiment, the position, orientation, and scale of the surgical tool 350 in surgery are guided to a predetermined state. Therefore, in the present embodiment, it is only required to perform image recognition and detection in a restricted regions of the surgical tool guide 402 or in the vicinity of the surgical tool guide 402, making it possible to suppress an increase in the processing volume for detecting the surgical tool 350. As a result, it is possible, in the present embodiment, to detect the surgical tool 350 with high accuracy and in real time. In addition, in the present embodiment, the surgical tool guide 402 can guide the insertion of the surgical tool 350 to a position not blocking the features on the image, making it possible to perform the tracking of the eyeball and the like with high accuracy.

<2.3 Modification of Display Image>

Furthermore, in the present embodiment, the display of the corneal guide 400, the surgical tool guide 402, and the like can be variously modified. Accordingly, modifications of the embodiment of the present disclosure will be described with reference to FIGS. 8 to 11. FIGS. 8 to 11 are diagrams illustrating an example of a display image according to a modification of the embodiment of the present disclosure.

As described above, the form of the corneal guide 400 is not limited to the annular form, and may be an elliptical shape or a polygonal shape, with no particular limitation. For example, in the example illustrated in FIG. 8, a corneal guide 400a includes a filled annular region having a wide width. Furthermore, in the present modification, the corneal guide 400a is not limited to one formed with a filled annular region, and may be, for example, a thick line, a thin line, a dotted line, or a blinking line or region of a color different from the background (such as red or black, for example).

Figure 9:
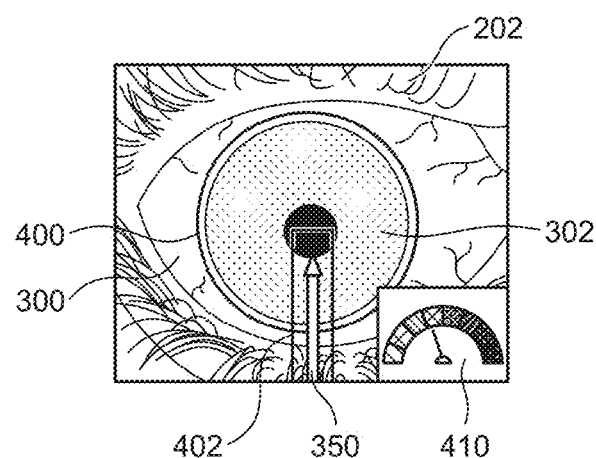
FIG. 9 is a diagram (part 2) illustrating an example of a display image according to a modification of the embodiment of the present disclosure.
Figure 10:
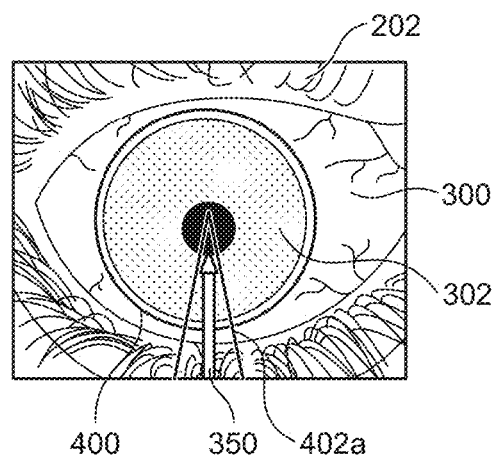
FIG. 10 is a view (part 3) illustrating an example of a display image according to a modification of the embodiment of the present disclosure.
Figure 11:
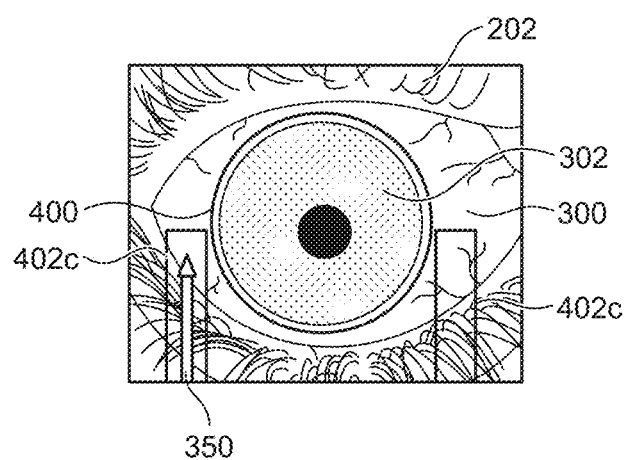
FIG. 11 is a diagram (part 4) illustrating an example of a display image according to a modification of the embodiment of the present disclosure.

Furthermore, in the present modification, for example, as illustrated in FIG. 9, when the state in which the surgical tool 350 is positioned in the surgical tool guide 402 is not detected, a clock display 410 indicating the elapsed time, the remaining time, and the like may be displayed. Alternatively, in the present modification, a meter indicating the degree of detection of the surgical tool 350 may be displayed. By performing such a display in the present modification, it is possible to prompt the surgeon to perform adjustment again. In the present modification, the clock display 410 may be displayed not only at the detection of the surgical tool 350 but also at the detection of the cornea 302.

Furthermore, in the present modification, as described above, the form of the surgical tool guide 402 is not limited to the rectangular form, and may be a circular shape, an elliptical shape, a triangular shape, or a polygonal shape, with no particular limitation. For example, in the example illustrated in FIG. 10, a surgical tool guide 402a has a shape of an isosceles triangular. Furthermore, in the present modification, the surgical tool guide 402 is not limited to the formation with a thick line, and may be formed with a filled region, for example, or may be a thick line, a thin line, a dotted line, or a blinking line or region of a color different from the background (such as red or black, for example).

Furthermore, in the present modification, as described above, the number of surgical tool guides 402 is not limited to one, and may be plural. For example, the guide is displayed as two surgical tool guides 402c in the example of FIG. 11.

Note that, in the present embodiment and the present modification, the surgical tool guide 402 is preferably displayed so as not to overlap with a region where the surgeon actually performs surgery or a region (region of interest) where the surgeon confirms a state at the time of surgery.

Furthermore, in the present embodiment and the present modification, in a case where the front image capturing unit 53 is a pair of video cameras capable of acquiring a three-dimensional stereo image, the parallax of the pair of video cameras may be adjusted so that the corneal guide 400 and the surgical tool guide 402 can be displayed on the front side so as not to be hidden by the eyeball 300. Alternatively, in the present embodiment and the present modification, instead of adjusting the parallax, the display positions of the corneal guide 400 and the surgical tool guide 402 may be fixed to be located on the front side of the eyeball 300 so that the corneal guide 400 and the surgical tool guide 402 are not hidden by the eyeball 300. Still alternatively, in the present embodiment and the present modification, the corneal guide 400 and the surgical tool guide 402 may be displayed on only one of the L image or the R image.

3. Summary

As described above, in the embodiment of the present disclosure, the position, shape, and size of the surgical tool 350 to be inserted are restricted by using the surgical tool guide 402 that guides the insertion of the surgical tool 350. Therefore, in the present embodiment, the position, orientation, and scale of the surgical tool 350 in surgery are guided to a predetermined state. Therefore, in the present embodiment, it is only required to perform image recognition and detection in a restricted regions of the surgical tool guide 402 or in the vicinity of the surgical tool guide 402, making it possible to suppress an increase in the processing volume for detecting the surgical tool 350. As a result, it is possible to detect the surgical tool 350 with high accuracy and in real time with the present embodiment, it is possible to quickly advance processes of acquiring an appropriate surgery start-time image according to the instruction of the surgeon. That is, in the present embodiment, it is possible to enhance the convenience of the ophthalmic surgery guidance.

In addition, in the present embodiment, the surgical tool guide 402 can guide the insertion of the surgical tool 350 to a position not blocking the features on the image, making it possible to perform the tracking of the eyeball and the like with high accuracy.

The embodiment of the present disclosure described above is given using an example of application to ophthalmic surgery guidance for performing surgery on an eyeball of a patient. However, the present embodiment is not limited to the application to such surgery, and is also applicable to surgery or the like on other sites.

4. Example of Schematic Configuration of Computer

A series of processing in the embodiments of the present disclosure described above can be executed by hardware and software. In a case where the series of processing is executed by software, a program constituting the software is installed in a computer. Here, the computer includes various computers such as a computer incorporated in dedicated hardware or a general-purpose personal computer capable of executing various functions by installing various programs, for example.

Figure 12:
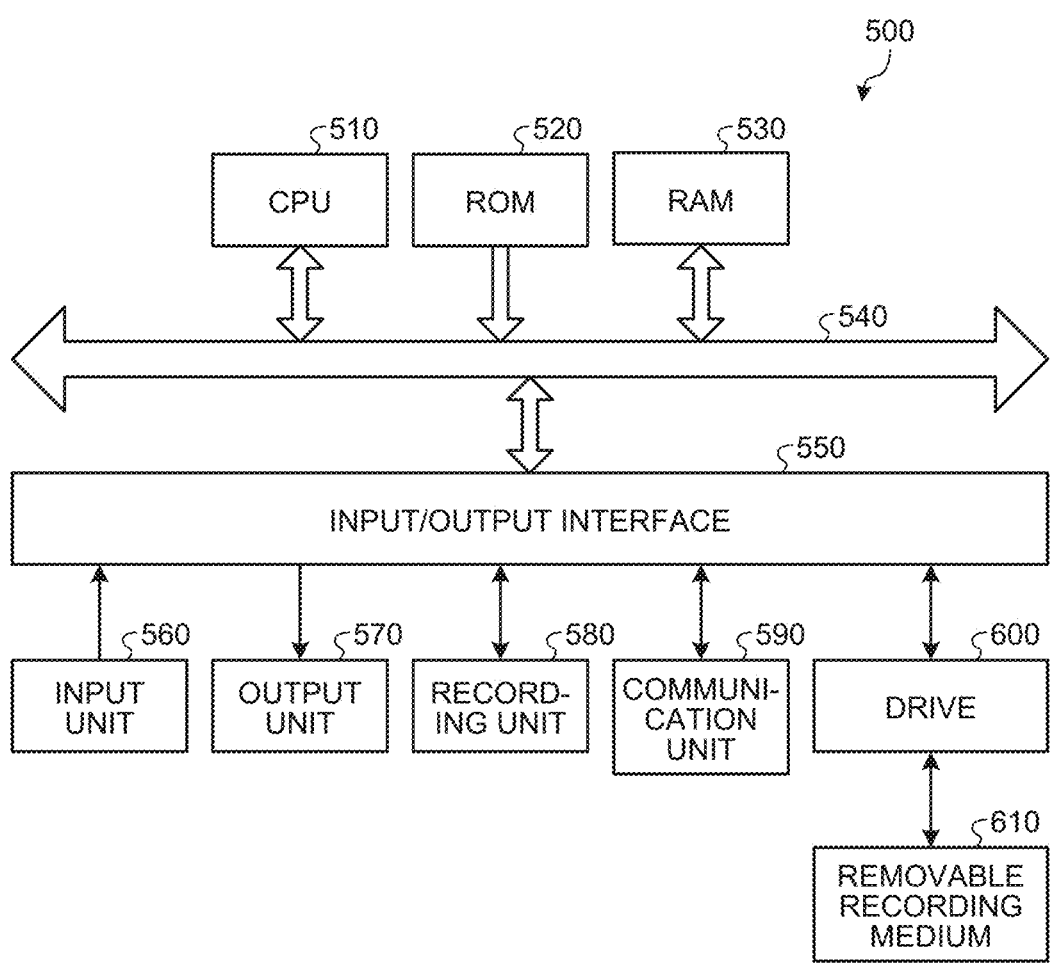
FIG. 12 is a diagram illustrating an example of a schematic configuration of a computer according to the embodiment of the present disclosure.

FIG. 12 is a diagram illustrating an example of a schematic configuration of a computer 500 that executes the above-described series of processing by a program.

As illustrated in FIG. 12, the computer 500 includes a central processing unit (CPU) 510, read only memory (ROM) 520, and random access memory (RAM) 530.

The CPU 510, the ROM 520, and the RAM 530 are connected to each other by a bus 540. The bus 540 is further connected to an input/output interface 550. The input/output interface 550 is connected to an input unit 560, an output unit 570, a recording unit 580, a communication unit 590, and a drive 600.

The input unit 560 includes a keyboard, a mouse, a microphone, an imaging element, and the like. The output unit 570 includes a display, a speaker, and the like. The recording unit 580 includes a hard disk, nonvolatile memory, and the like. The communication unit 590 includes a network interface and the like. The drive 600 drives a removable recording medium 610 such as a magnetic disk, an optical disk, a magneto-optical disk, or semiconductor memory.

In the computer 500 configured as described above, the above-described series of processing is performed by operation, for example, in which the CPU 510 loads a program recorded in the recording unit 580 into the RAM 530 via the input/output interface 550 and the bus 540 and executes the program.

The program executed by the computer 500, that is, the CPU 510 can be provided by being recorded in the removable recording medium 610 as a package medium or the like, for example. Note that the program can be provided via a wired or wireless transmission medium such as a local area network, the Internet, or digital satellite broadcasting.

In the computer 500, the program can be installed in the recording unit 580 via the input/output interface 550 by using the removable recording medium 610 inserted to the drive 600. Furthermore, the program can be received by the communication unit 590 via a wired or wireless transmission medium and installed in the recording unit 580. In addition, the program can be preinstalled in the ROM 520 or the recording unit 580.

Note that the program executed by the computer 500 may be a program that executes processing in time series in the order described in the present specification, or may be a program that executes processing in parallel or as appropriate at necessary timing such as being called. Furthermore, for example, the above computer 500 may adopt a configuration of cloud computing in which one function is cooperatively shared and processed by a plurality of devices via a network.

5. Supplementary Notes

The embodiment of the present disclosure described above can include, for example, an information processing method executed in the surgical microscope system 1 as described above, a program for causing the surgical microscope system 1 to function, and a non-transitory tangible medium recording the program. In addition, the program may be distributed via a communication line (including wireless communication) such as the Internet.

Furthermore, each step in the processing of the embodiment of the present disclosure described above does not necessarily have to be processed in the described order. For example, the individual steps may be processed in an appropriately changed order. In addition, each step may be partially processed in parallel or individually instead of being processed in time series. Furthermore, the processing method of each step may not necessarily be processed according to the described method, and may be processed by another method by another functional unit, for example.

Among individual processes described in each embodiment, all or a part of the processes described as being performed automatically may be manually performed, or the processes described as being performed manually can be performed automatically by a known method. In addition, the processing procedures, specific names, and information including various data and parameters illustrated in the above Literatures or drawings can be arbitrarily altered unless otherwise specified. For example, a variety of information illustrated in each of the drawings are not limited to the information illustrated.

In addition, each of components of each device is provided as a functional and conceptional illustration and thus does not necessarily need to be physically configured as illustrated. That is, the specific form of distribution/integration of each device is not limited to those illustrated in the drawings, and all or a part thereof may be functionally or physically distributed or integrated into arbitrary units according to various loads and use situations.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Note that the present technique can also have the following configurations.

(1) An image processing device comprising:
   an image input unit that receives an operative field image;
   a display image generation unit that superimposes a first guide that guides a user to a motion of a surgery start instruction on the operative field image to generate a display image; and
   a processing start unit that starts surgery start-time processing when having detected the surgery start instruction within the first guide.

(2) The image processing device according to (1), further comprising:
   a preoperative plan reception unit that receives a preoperative image based on a preoperative plan; and
   a registration unit that performs alignment on the preoperative image or an operative field image after a start of surgery based on a comparison between the preoperative image and the operative field image after the start of surgery.

(3) The image processing device according to (1) or (2), wherein the processing start unit detects that a surgical tool has been inserted into a region of an operative field corresponding to an interior of the first guide as the surgery start instruction, and starts the surgery start-time processing by the detection.

(4) The image processing device according to (3), wherein the processing start unit detects a difference between images within the first guide in the operative field image, and detects insertion of the surgical tool by the detection of the difference.

(5) The image processing device according to (4), wherein the processing start unit detects that there is no difference in images outside the first guide.

(6) The image processing device according to (3), wherein the processing start unit detects that the surgical tool has been inserted based on an algorithm obtained by machine learning using an image of the surgical tool.

(7) The image processing device according to any one of (1) to (6),
   wherein the processing start unit starts processing of acquiring the operative field image at surgery start-time, as the surgery start-time processing.

(8) The image processing device according to any one of (1) to (7), wherein the display image generation unit superimposes a plurality of the first guides on the operative field image.

(9) The image processing device according to any one of (1) to (8), wherein the first guide has any of shapes including a circular shape, an elliptical shape, a triangular shape, and a polygonal shape.

(10) The image processing device according to any one of (1) to (9), wherein the first guide includes any of a filled region, a solid line, a dotted line, or a blinking line.

(11) The image processing device according to any one of (1) to (10), wherein the display image generation unit adjusts a size of the first guide based on zooming of an image capturing unit that captures the operative field image.

(12) The image processing device according to (3),
   wherein the display image generation unit generates the display image by superimposing a second guide for adjusting a position and orientation of the operative field on the operative field image before generating the display image on which the first guide is superimposed, and
   in a case where the processing start unit has detected the operative field within the second guide in the operative field image, the processing start unit outputs an instruction to superimpose the first guide to the display image generation unit.

(13) The image processing device according to (12),
wherein in a case where the processing start unit has detected the operative field within the second guide, the processing start unit performs processing of acquiring the operative field image at a time of the detection.

(14) The image processing device according to (12) or (13), wherein the processing start unit detects a predetermined shape to detect that the operative field is located within the second guide.

(15) The image processing device according to (12) or (13), wherein the processing start unit detects that the operative field is located within the second guide based on an algorithm obtained by machine learning using an image of the operative field.

(16) The image processing device according to any one of (12) to (15), wherein the second guide has any of shapes including a circular shape, an elliptical shape, and a polygonal shape.

(17) The image processing device according to any one of (1) to (16), wherein the operative field image is an image of an eyeball of a patient.

(18) The image processing device according to (1), further comprising:
an eyeball tracker unit that tracks an eyeball in the operative field image and detects displacement of the eyeball in the operative field image;
a preoperative plan reception unit that receives a preoperative image based on a preoperative plan for the eyeball and position information of a mark; and
an information accumulation unit that compares the preoperative image with the operative field image at surgery start-time and converts position information of the mark in accordance with the operative field image at the surgery start-time by the comparison, and accumulates the operative field image at the surgery start-time and the converted position information of the mark,
wherein the eyeball tracker unit compares the operative field image at the surgery start-time with the operative field image in real time and tracks the eyeball in the operative field image by the comparison, and outputs displacement information indicating a difference between positional information of the eyeball in the operative field image and positional information of the mark which has been obtained by the conversion, and
the display image generation unit changes the position of the operative field image based on the displacement information so as to cancel a positional change of the eyeball with respect to the mark fixed based on the converted positional information of the mark, and generates the display image.

(19) An image processing method to be performed by an image processing device, the method comprising:
receiving an operative field image;
superimposing a first guide that guides a user to a motion of a surgery start instruction on the operative field image to generate a display image; and
starting surgery start-time processing when having detected the surgery start instruction within the first guide.

(20) A surgical microscope system comprising:
a surgical microscope that obtains an operative field image;
an image processing device that generates a display image; and
a display device that displays the display image,
wherein the image processing device includes:
an image input unit that receives the operative field image;
a display image generation unit that superimposes a first guide that guides a user to a motion of a surgery start instruction on the operative field image to generate a display image; and
a processing start unit that starts surgery start-time processing when having detected the surgery start instruction within the first guide.

REFERENCE SIGNS LIST

1 Surgical Microscope System
10 Surgical Microscope
11 Objective Lens
12 Eyepiece
13 Image Processing Device
13A Control Unit
13a Preoperative Plan Reception Unit
13b Image Input Unit
13c Registration Unit
13d Information Accumulation Unit
13e Eyeball Tracking Unit
13f Display Image Generation Unit
13g Processing Start Unit
14 Monitor
20 Patient Bed
51 Light Source
52 Observation Optical System
52a Half Mirror
53 Front Image Capturing Unit
54 Tomographic Image Capturing Unit
55 Presentation Unit
56 Interface Unit
57 Speaker
200, 202 Operative Field Image
300 Eyeball
302 Cornea
350 Surgical Tool
400, 400a Corneal Guide
402, 402a, 402c Surgical Tool Guide
410 Clock Display

The invention claimed is:
1. An image processing device comprising:
circuitry configured to
receive an operative field image;
superimpose a second guide for adjusting a position and orientation of the operative field on the operative field image;
generate a first guide that guides a user to a motion of a surgery start instruction on the operative field image to generate a display image;
detect that a surgical tool has been inserted into a region of an operative field corresponding to an interior of the first guide as the surgery start instruction;
in response to detection of insertion of the surgical tool, start the surgery start-time processing; and
in response to an operative field being within the second guide in the operative field image, superimpose the first guide on the display image.

2. The image processing device according to claim 1, wherein the circuitry is further comprising configured to:
receives receive a preoperative image based on a preoperative plan; and
perform alignment on the preoperative image or an operative field image after a start of surgery based on a comparison between the preoperative image and the operative field image after the start of surgery.

3. The image processing device according to claim 1, wherein the circuitry is configured to detect insertion of the surgical tool in response to a difference between images within the first guide in the operative field image.

4. The image processing device according to claim 3, wherein the circuitry is configured to detect insertion of the surgical tool when there is no difference in images outside the first guide.

5. The image processing device according to claim 1, wherein the circuitry is configured to detect that the surgical tool has been inserted based on an algorithm obtained by machine learning using an image of the surgical tool.

6. The image processing device according to claim 1, wherein the circuitry is configured to start acquiring the operative field image at surgery start-time, as the surgery start-time processing.

7. The image processing device according to claim 1, wherein the circuitry is configured to superimpose a plurality of the first guides on the operative field image.

8. The image processing device according to claim 1, wherein the first guide has any of shapes including a circular shape, an elliptical shape, a triangular shape, and a polygonal shape.

9. The image processing device according to claim 1, wherein the first guide includes any of a filled region, a solid line, a dotted line, or a blinking line.

10. The image processing device according to claim 1, wherein the circuitry is configured to adjust a size of the first guide based on zooming of a sensor that captures the operative field image.

11. The image processing device according to claim 1, wherein, in response to the operative field being within the second guide, the circuitry is further configured to acquire the operative field image at a time of the detection.

12. The image processing device according to claim 1, wherein the circuitry is configured to detect that the operative field is located within the second guide by detecting a predetermined shape.

13. The image processing device according to claim 1, wherein the circuitry is configured to detect that the operative field is located within the second guide based on an algorithm obtained by machine learning using an image of the operative field.

14. The image processing device according to claim 1, wherein the second guide has any of shapes including a circular shape, an elliptical shape, and a polygonal shape.

15. The image processing device according to claim 1, wherein the operative field image is an image of an eyeball of a patient.

16. The image processing device according to claim 1, wherein the circuitry is further configured to:
track an eyeball in the operative field image and detect displacement of the eyeball in the operative field image;
receive a preoperative image based on a preoperative plan for the eyeball and position information of a mark;
compare the preoperative image with the operative field image at surgery start-time and convert position information of the mark in accordance with the operative field image at the surgery start-time by the comparison, and accumulate the operative field image at the surgery start-time and the converted position information of the mark;
compare the operative field image at the surgery start-time with the operative field image in real time and track the eyeball in the operative field image by the comparison;
output displacement information indicating a difference between positional information of the eyeball in the operative field image and positional information of the mark which has been obtained by the conversion; and
change the position of the operative field image based on the displacement information so as to cancel a positional change of the eyeball with respect to the mark fixed based on the converted positional information of the mark, and generate the display image.

17. The image processing device according to claim 1, wherein, after the operative field is detected as being within the second guide, at least one of a focus, zoom, and brightness of an image sensor that captures the operative field image are fixed.

18. The image processing device according to claim 1, wherein the circuitry is configured to detect insertion of the surgical tool by detecting a difference between a pre-surgery start-time image, acquired at a time of the detection of the operative field within the second guide, and a subsequent operative field image.

19. An image processing method to be performed by an image processing device, the method comprising:
receiving an operative field image;
superimposing a second guide for adjusting a position and orientation of the operative field on the operative field image;
detecting the operative field within the second guide in the operative field image;
in response to detecting the operative field within the second guide, superimposing a first guide that guides a user to a motion of a surgery start instruction on the operative field image to generate a display image; and
starting surgery start-time processing when having detected that a surgical tool has been inserted into a region of the operative field corresponding to an interior of the first guide.

20. A surgical microscope system comprising:
a surgical microscope that obtains an operative field image;
an image processing device that generates a display image; and
a display device that displays the display image,
wherein the image processing device includes:
circuitry configured to
receive an operative field image;
superimpose a second guide for adjusting a position and orientation of the operative field on the operative field image;
generate a first guide that guides a user to a motion of a surgery start instruction on the operative field image to generate a display image;
detect that a surgical tool has been inserted into a region of an operative field corresponding to an interior of the first guide as the surgery start instruction;
in response to detection of insertion of the surgical tool, start the surgery start-time processing; and in response to an operative field being within the second guide in the operative field image, superimpose the first guide on the display image.

* * * * *